United States Patent [19]
Muto

[11] Patent Number: 4,787,682
[45] Date of Patent: Nov. 29, 1988

[54] METHOD OF ESTIMATING VEHICLE SPEED

[75] Inventor: Tetsuji Muto, Saitama, Japan

[73] Assignee: Honda Giken Kogyo Kabushiki Kaisha, Tokyo, Japan

[21] Appl. No.: 32,471

[22] Filed: Mar. 30, 1987

[30] Foreign Application Priority Data

Mar. 28, 1986 [JP] Japan .................. 61-71552

[51] Int. Cl.⁴ .................. B60T 8/68; B60T 8/60; G06G 7/78
[52] U.S. Cl. .................. 303/109; 303/103; 364/426.01
[58] Field of Search .................. 303/91, 100, 103, 105, 303/106, 109, 110, 111, 95, 96; 364/426; 188/181 C

[56] References Cited

U.S. PATENT DOCUMENTS

| 3,883,186 | 5/1975 | Rodi .................. | 303/109 |
| 4,094,556 | 6/1978 | Okamoto et al. .................. | 303/109 |
| 4,338,667 | 7/1982 | Cook et al. .................. | 303/109 X |
| 4,446,522 | 5/1984 | Sato et al. .................. | 303/106 X |
| 4,468,740 | 8/1984 | Beck et al. .................. | 364/426 |

FOREIGN PATENT DOCUMENTS 0006902 2/1981 Japan .

Primary Examiner—Andres Kashnikow
Assistant Examiner—Timothy Newholm
Attorney, Agent, or Firm—Lyon & Lyon

[57] ABSTRACT

In estimating a vehicle speed from a wheel speed and comparing the wheel speed with a reference threshold provided on the basis of that vehicle speed to control the supplying of a hydraulic braking pressure to wheel brakes, when the wheel speed is larger than the estimated vehicle speed, a predetermined value is added to that estimated vehicle speed to amend the latter, and conversely, when the wheel speed is smaller than the estimated vehicle speed, a predetermined value is subtracted from that estimated vehicle speed to amend the latter. Thus, the amended values are used as an estimated vehicle speed for controlling the hydraulic braking pressure.

12 Claims, 7 Drawing Sheets

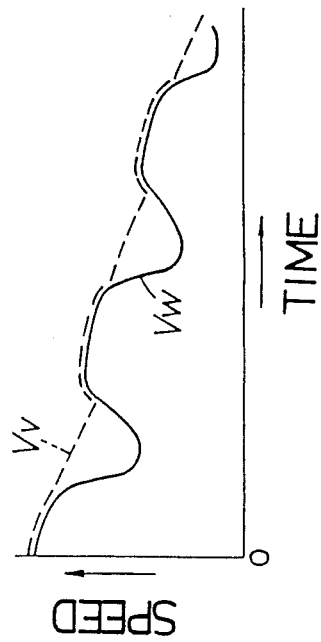

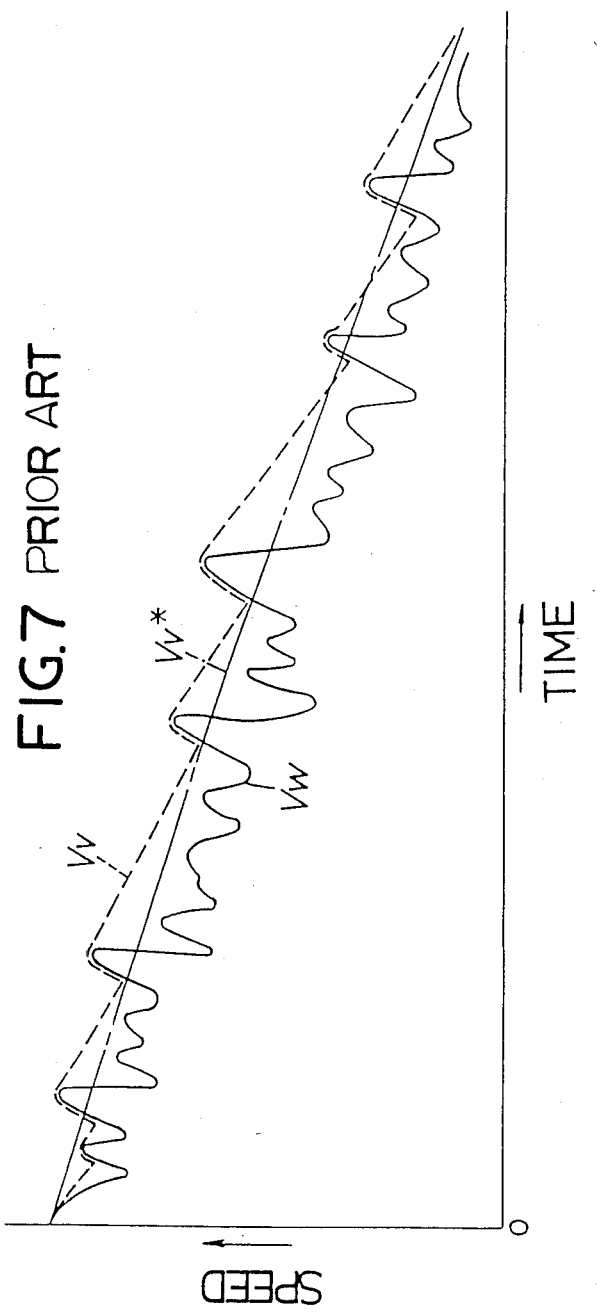

METHOD OF ESTIMATING VEHICLE SPEED

BACKGROUND OF THE INVENTION

1. Field of the Invention

The present invention relates to a method of estimating a vehicle speed of a vehicle, comprising estimating the vehicle speed on the basis of a wheel speed and comparing a reference threshold derived from the estimated vehicle speed with the wheel speed to control the supplying of hydraulic braking pressure to wheel brakes.

2. Description of the Prior Art

Such a method of estimating a vehicle speed has been known, for example, from Japanese patent publication No. 6902/81.

In the above prior art, a wheel speed is compared with an estimated vehicle speed, and when the wheel speed is larger than the estimated vehicle speed, the wheel speed is used as an estimated vehicle speed. When the wheel speed is smaller than the estimated vehicle speed, a speed corresponding to $-0.8$ to $-1.1G$ is subtracted from the estimated vehicle speed until the wheel speed has been equal to such estimated vehicle speed and the obtained value is used as a new estimated vehicle speed.

Such a characteristic can be illustrated as shown in FIG. 6. That is, troughs of a wheel speed Vw are connected with a predetermined gradient, so that a tentative vehicle speed Vv is estimated.

With such an estimating method, however, the following problem arises: The load of wheel contacting the ground varies during travelling of a vehicle on a rough or bad road and hence, the braking force also varies during braking even if depressing force on a brake pedal is constant. For this reason, a longitudinal pulsation is generated in a suspension and causes a pulsation in the speed of a wheel which is rotating in contact with the ground. With this pulsation produced in the wheel speed, an estimated vehicle speed Vv goes above an actual vehicle speed Vv* as shown in FIG. 7. As a result, a condition is apt to appear that a wheel speed Vw falls below a reference threshold derived from an estimated vehicle speed Vv.

SUMMARY OF THE INVENTION

The present invention has been accomplished with such circumstances in view, and it is an object of the present invention to provide a method of estimating a vehicle speed, wherein an estimated vehicle speed is prevented from becoming larger than an actual vehicle speed during travelling of a vehicle on a rough or bad road.

According to the present invention, there is provided a method of estimating a vehicle speed, comprising estimating a vehicle speed on the basis of a wheel speed and comparing a reference threshold derived from the estimated vehicle speed with the wheel speed to control the supplying of a hydraulic braking pressure to a wheel brake, wherein when the wheel speed is larger than the estimated vehicle speed, a predetermined value is added to that estimated vehicle speed to give a new estimated vehicle speed, and when the wheel speed is smaller than the estimated vehicle speed, a predetermined value is subtracted from that estimated vehicle speed to give a new estimated vehicle speed.

This enables a change in magnitude of the estimated vehicle speed to be forcedly moderated with respect to a change in the wheel speed even if pulsation occurs in a wheel speed during travelling of a vehicle on a rough or bad road.

The above and other objects, features and advantages of the invention will become apparent from reading of the following detailed description of the preferred embodiments taken in conjunction with the accompanying drawings.

BRIEF DESCRIPTION OF THE DRAWINGS

FIGS. 1 to 5 illustrate one embodiment of the present invention, wherein

FIG. 1 is a diagram of a hydraulic control circuit;

FIG. 2 is a simplified circuit diagram showing a construction of control means;

FIG. 3 is a circuit diagram showing an arrangement for estimating a vehicle speed;

FIG. 4 is a graph illustrating an anti-lock operational condition; and

FIG. 5 is a graph illustrating a characteristic provided when the wheel speed is pulsated; and FIGS. 6 and 7 illustrate the prior art, wherein FIG. 6 is a graph illustrating a characteristic in estimating a vehicle speed; and FIG. 7 is a graph illustrating a characteristic provided when the wheel speed is pulsated.

DESCRIPTION OF THE PREFERRED EMBODIMENT

Figure 1:
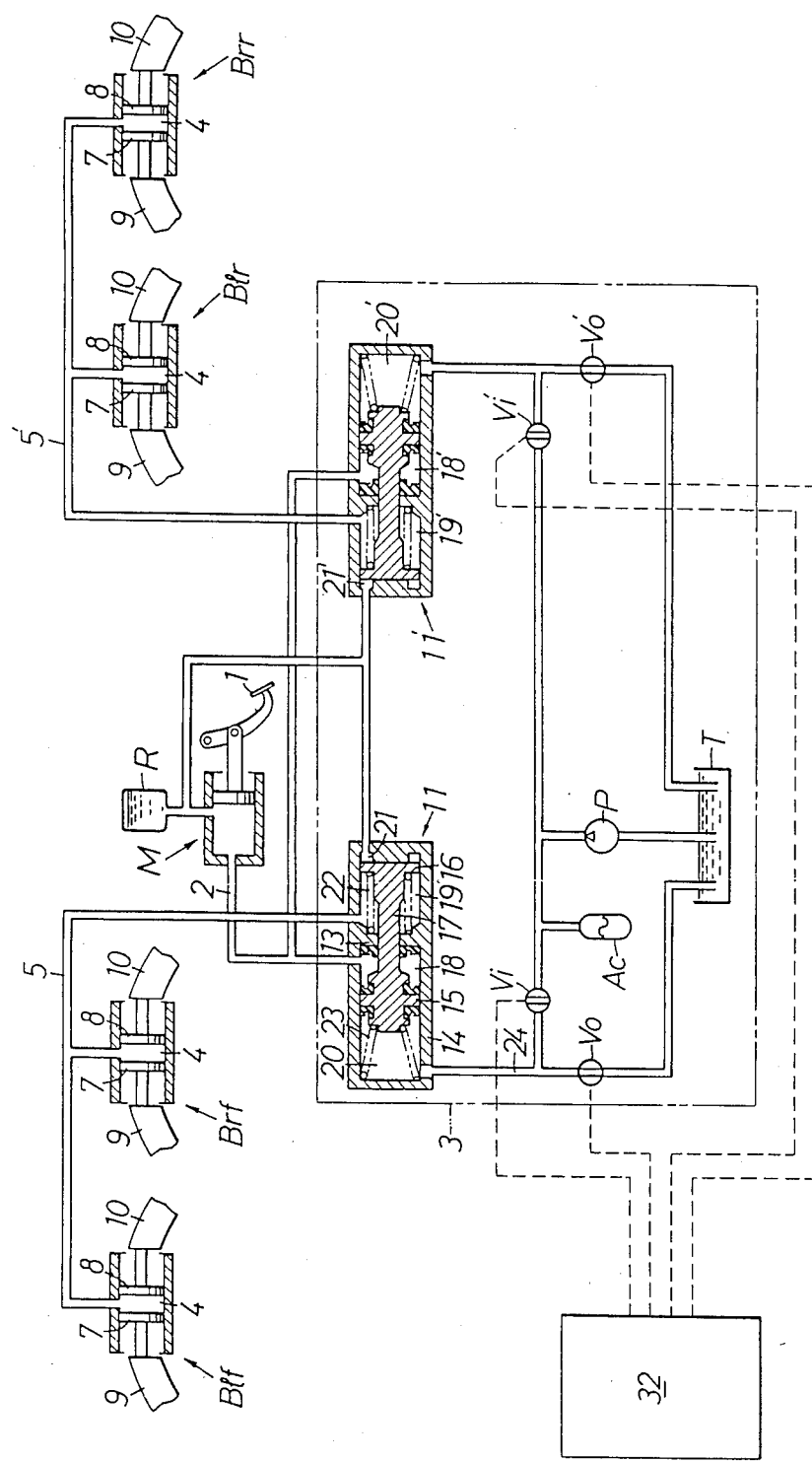

One embodiment of the present invention will now be described with reference to the accompanying drawings. Referring first to FIG. 1, a brake pedal 1 is operatively connected to a master cylinder M, so that upon depressing the brake pedal 1 by a driver, the master cylinder M develops a hydraulic pressure in an oil passage 2. The oil passage 2 is connected to a hydraulic pressure control circuit 3 from which is delivered a hydraulic braking pressure corresponding to the above-described hydraulic pressure.

A wheel brake is mounted on each of left and right driving wheels and left and right driven wheels of a vehicle, and these wheel brakes are supplied with the hydraulic braking pressure from the hydraulic pressure control circuit 3. For example, in a front wheel drive vehicle, a left front wheel brake Blf and a right front wheel brake Brf are mounted on left and right front wheels as driving wheels, while a left rear wheel brake Blr and a right rear wheel brake Brr are mounted on left and right rear wheels as driven wheels. Each of the brakes Blf, Brf, Blr and Brr is, for example, a drum brake. An oil passage 5 from the hydraulic pressure control circuit 3 is in communication with a braking oil chamber 4 of each of the left and right front wheel brakes Blf and Brf, while an oil passage 5' from the hydraulic pressure control circuit 3 is in communication with a braking oil chamber 4 of each of the left and right rear wheel brakes Blr and Brr.

In each brake Blf, Brf, Blr, Brr, when a hydraulic braking pressure is supplied into each braking oil chamber 4, pistons 7 and 8 are actuated in a direction away from each other, causing brake shoes 9 and 10 to be brought into contact with a brake drum (not shown) to produce a braking torque. If the hydraulic braking pressure within each braking oil chamber 4 is too large, the braking torque produced between each brake shoe 9, 10 and the brake drum becomes too large, and as a result, the wheel tends to become locked. When the wheel is about to be locked, the hydraulic braking pressure is reduced by the hydraulic pressure control circuit 3, thereby avoiding the wheel from being locked.

The hydraulic pressure control circuit 3 comprises a modulator 11 associated with the left and right front brakes Blf and Blr and a modulator 11' associated with the left and right rear brakes Blr and Brr. Since the two modulators 11 and 11' have basically the same construction, only the arrangement of one modulator 11 will be described in detail.

The modulator 11 is closed at its opposite ends and comprises a cylinder portion 14 partitioned at its intermediate portion by a partition wall 13 and a rod 17 having a pair of pistons 15 and 16 at its opposite ends and having a portion between the pistons 15 and 16, which passes through the partition wall 13 for axially sliding movement in contact therewith. A cylinder chamber between the partition wall 13 and one 15 of the pistons serves as a primary hydraulic braking pressure chamber 18 and connected to the master cylinder M through the oil passage 2. Also, a cylinder chamber between the partition wall 13 and the other piston 16 serves as a secondary hydraulic braking pressure chamber 19 and connected to the braking oil chambers 4 of the left and right front wheel brakes Blf and Brf through the oil passage 5. An anti-lock hydraulic control chamber 20 is defined between one of the ends of the cylinder portion 14 and the one piston 15, while a hydraulic discharge oil chamber 21 is defined between the other end of the cylinder portion 14 and the other piston 16 and connected to a reservoir R for the master cylinder M. A spring 22 is contained in the secondary hydraulic braking pressure chamber 19 for biasing the piston 16 away from the partition wall 13, while a spring 23 is contained in the anti-lock hydraulic control chamber 20 for biasing the piston 15 toward the partition wall 13.

An oil passage 24 is connected to the anti-lock hydraulic control chamber 20. The oil passage 24 is also connected to a hydraulic pump P via a normally-closed inlet valve Vi and to an oil tank T via a normally-closed outlet valve Vo. An accumulator Ac is connected between the inlet valve Vi and hydraulic pump P.

Also in other modulator 11', a primary hydraulic braking chamber 18' communicates with the master cylinder M, and a secondary hydraulic braking pressure chamber 19' communicates with the braking oil chambers 4 of the left and right rear wheel brakes Blr and Brr via oil passage 5'. A hydraulic discharge oil chamber 21' is in communication with the reservoir R. Further, an anti-lock hydraulic control chamber 20' is connected to the hydraulic pump P via a normally-closed inlet valve Vi' and to the oil tank T via a normally-opened outlet valve Vo'.

The both inlet valves Vi and Vi' and the both outlet valves Vo and Vo' are each a solenoid valve and controlled its opening and closing by control means 32.

With the inlet valves Vi and Vi' closed and the outlet valves Vo and Vo' opened, the anti-lock hydraulic control chamber 20 and 20' are opened into the oil tank T. When the brake pedal 1 is depressed to supply a hydraulic pressure from the master cylinder M into the primary hydraulic braking pressure chambers 18 and 18', the volumes of the secondary hydraulic braking chambers 19 and 19' decrease, and a hydraulic braking pressure corresponding to the hydraulic pressure fed from the master cylinder M is supplied into the hydraulic braking pressure chambers 4 in the individual wheel brakes Blf, Brf, Blr and Brr. Accordingly, braking torque increases freely depending upon the driver's braking operation.

When the outlet valves Vo and Vo' are closed with the inlet valves Vi and Vi' left closed, the control oil in the anti-lock hydraulic control chambers 20 and 20' is brought into a locked state, so that the secondary hydraulic braking pressure chambers 19 and 19' in the individual modulators 11 and 11' are invariable in volume despite increase or decrease in hydraulic pressure supplied into the primary hydraulic braking pressure chambers 18 and 18'. Hence, torque during braking is maintained at a constant magnitude irrespective of the driver's braking operation. Such operational condition is applicable when there is produced a possibility for the wheels to be locked.

When the inlet valves Vi and Vi' are opened and the outlet valves Vo and Vo' are closed, an anti-lock hydraulic control pressure is supplied into the anti-lock hydraulic pressure chambers 20 and 20', so that the volumes of the secondary hydraulic braking pressure chambers 19 and 19' increase in spite of the hydraulic pressure from the master cylinder M acting on the primary hydraulic braking pressure chambers 18 and 18', resulting in a decreased hydraulic pressure in the braking oil chambers 4 of the individual wheel brakes Blf, Brf, Blr and Brr to lower the braking torque. Thus, when the wheels are about to be locked, opening of the inlet valves Vi and Vi' and closing of the outlet valves Vo and Vo' enable the locking of the wheels to be avoided.

Figure 2:
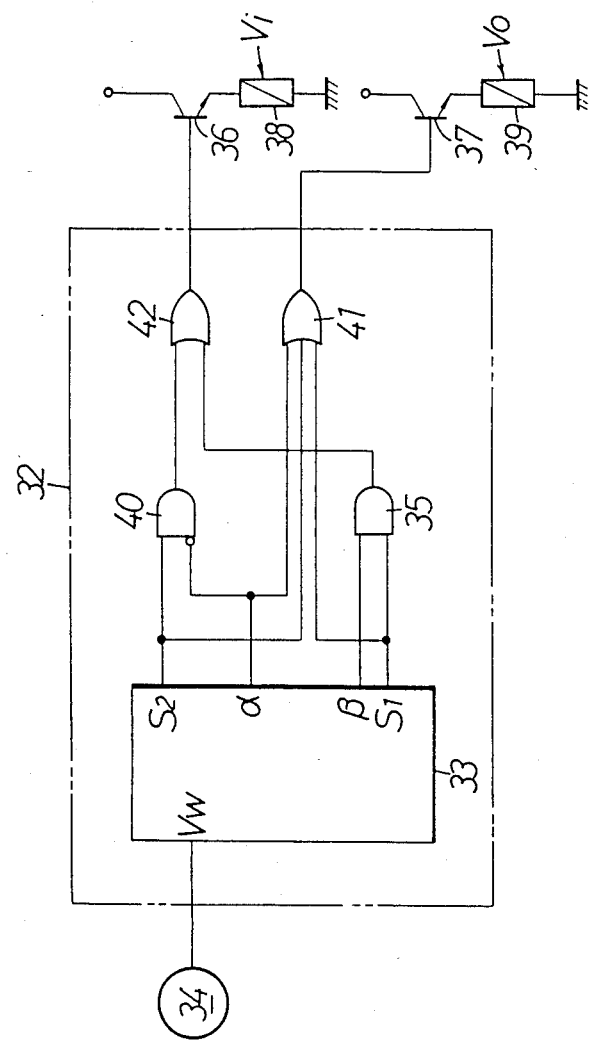

The construction of the control means 32 will now be described with reference to FIG. 2. The construction for controlling the inlet valve Vi and outlet valve Vo associated with the one set of the wheel brakes Blf and Brf is basically indentical with the construction for controlling the inlet valve Vi' and outlet valve Vo' associated with the other set of the wheel brakes Blr and Brr and hence, only the former arrangement will be described.

The control means 32 is provided with a judgement circuit 33 such as a microcomputer, which determines whether the wheels are locked or not and outputs a signal for opening or closing the inlet valve Vi and outlet valve Vo on the basis of the determined result.

Now considering a criterion of judgement for deciding to output a signal for carrying out an anti-lock control operation when which condition has been satisfied, the following four systems (a) to (d) have been proposed:

(a) A system in which a signal $\beta$ is outputted upon establishment of wheel acceleration $\dot{V}w < $ reference wheel deceleration $-\dot{V}wo$ to lessen the braking pressure.

(b) A system in which a signal S1 is outputted upon establishment of wheel speed $Vw < $ first reference wheel speed $Vr_1$ to lessen the hydraulic braking pressure. In this case, $Vr_1 = Vv(1-\lambda_1)$ wherein $Vv$ is a vehicle speed, and $\lambda_1$ is a suitable slip ratio of the wheel. Therefore, if a slip ratio of the wheel is represented by $\lambda$, $Vw < Vr_1$ has the same meaning as $\lambda > \lambda_1$ and when $Vw < Vr_1$ or $\lambda > \lambda_1$ is established, the signal $S_1$ is outputted.

(c) A system in which the hydraulic braking pressure is lessened when either (a) or (b) above is established.

(d) A system in which the hydraulic braking pressure is lessened when both of (a) and (b) above are simultaneously established.

In the system (a) above, the reference wheel deceleration $-\dot{V}wo$ is set at a value, for example, usually in a range of $-2.0$ to $1.2G$, which cannot be provided during braking in a condition where there is no possibility for the wheels to be locked. According to this system, however, a wheel deceleration on the order of $-1.0$ to $-0.5G$ may be produced in some cases during a braking operation conducted on a snowy or frozen road or the like, and a signal for lessening the hydraulic braking pressure is not outputted in spite of the wheels being locked during the latter portion of the braking operation. In addition, when the vehicle is travelling on a rough or bad road, the wheel acceleration $\dot{V}w$ finely pulsates even during usual braking, and a signal $\beta$ is outputted even when there is no fear of wheel locking, resulting in a decreased braking efficiency.

In the system (b), if the wheel speed $Vw$ is increasing, it is judged that the hydraulic braking pressure has been sufficiently lessened even if the slip ratio $\lambda$ is higher, i.e., even if the signal $S_1$ has been outputted. Even within this duration, the hydraulic braking pressure is lessened, resulting in a reduced braking efficiency.

It is obvious that the system (c) has the disadvantages found in the systems (a) and (b).

Finally, the system (d) overcomes the problem of a decrease in braking efficiency during travelling of a vehicle on a rough road and the problem that the hydraulic braking pressure is lessened during increasing of the wheel speed $Vw$ which leads to a decreased braking efficiency. Further, if the reference wheel deceleration $-\dot{V}wo$ is set within a range of wheel decelerations occurring during braking when the vehicle is travelling on a normal road, for example, in a range of $-1.0$ to $0G$, preferably $-0.3$ to $-0.6G$, it is possible in a braking operation conducted during travelling of the vehicle on a snowy or frozen road to detect the locking of the wheels to lessen the hydraulic braking pressure, even when the wheel deceleration is at a level of $-1.0$ to $-0.5G$.

Thereupon, a signal corresponding to a wheel speed $Vw$ is inputted from the wheel speed detector 34 into the judgement circuit 33 where wheel speed $Vw$ and a wheel acceleration $\dot{V}w$ calculated on the basis of such wheel speed $Vw$ are compared respectively with the first reference wheel speed $Vr_1$ and the reference wheel deceleration $-\dot{V}wo$, as described above. When $\dot{V}w<-\dot{V}wo$ and $Vw<Vr_1$ have been established, high-level signals $\beta$ and $S_1$ are outputted from the judgement circuit 33, respectively. These signals $\beta$ and $S_1$ are inputted into an AND gate 35, and when they are at high levels, a transistor 36 is turned on to excite a solenoid 38, thereby opening the inlet valve Vi. When a high-level signal $S_1$ has been outputted, a transistor 37 is turned on to excite a solenoid 39, thereby closing the outlet valve Vo.

Here, when the braking torque starts to be reduced upon outputting of the signals $\beta$ and $S_1$, as described above, the wheel speed is still decreasing. This means that the braking torque is still larger than the driving torque on the road surface, showing a state where the locking possibility of wheels has not yet been completely overcome at this point. In general, however, the system has an operational delay of about 10 ms. For this reason, the hydraulic braking pressure is further lessened even after the lessening signal has been extinguished and hence, a good effect is usually provided in this system. In some cases, however, the braking pressure cannot be sufficiently lessened under certain conditions of the road surface to cause the wheel speed to vary toward locking. To overcome such phenomenon, a lessening signal may be generated when $\lambda>\lambda_1$, until the wheel speed $Vw$ has certainly been turned into an acceleration. In general, however, the lessening signal is retained until $\dot{V}w>0$ has been attained, in spite of a satisfactory controlling being usually provided even when the generation of the lessening signal is stopped upon establishment of $\dot{V}w>-\dot{V}wo$. This causes the braking torque to be over-lessened, which is disadvantageous. However, this offers no problem in practice with the wheels receiving a distribution of smaller braking load.

Thereupon, a second reference wheel speed $Vr_2$ is set to correspond to a second reference slip ratio $\lambda_2$ wherein $\lambda_2>\lambda_1$, so that only when $Vw<Vr_2$, i.e., $\lambda>\lambda_2$ has been established to increase the possibility for the wheels to be locked, the lessening signal is retained until the wheel speed $Vw$ has been turned into an acceleration. That is, in the judgement circuit 33, it is judged whether or not $Vw<Vr_2$ or $\lambda>\lambda_2$ and when such conditions are satisfied, a signal $S_2$ is outputted therefrom. In addition, in order to judge that the wheel speed is increasing, an acceleration reference threshold $+\dot{V}wo$ is set, so that a signal $\alpha$ is outputted when $\dot{V}w>+\dot{V}wo$.

The signal $S_2$ is inputted into one input terminal of an AND gate 40 and also into an OR gate 41, while the signal $\alpha$ is inputted into the OR gate 41, and invertedly inputted into the AND gate 40. Further, the signal $S_1$ is also inputted into the OR gate 41, and an output from the OR gate 41 is applied to the base of the transistor 37. Outputs from both the AND gates 35 and 40 are inputted into an OR gate 42 which in turn supplies an output to the base of the transistor 36.

With such control means 32, if any one of the signals $S_1$, $\alpha$ and $S_2$ goes into a high level, the transistor 37 is turned on to close the outlet valve Vo. Either when both of the signals $\beta$ and $S_1$ are at high levels or when the signal $S_2$ is at a high level with the signal $\alpha$ at a low level, the inlet valve Vi is opened.

Description will now be made of a method of setting first and second reference wheel speeds $Vr_1$ and $Vr_2$. These wheel speeds will be determined ideally by detecting a vehicle speed $V$ and taking suitable reference slip ratios $\lambda_1$ and $\lambda_2$ into consideration along with such detected vehicle speed $V$, i.e., from the calculation in the following equations:

$$Vr_1 = V(1-\lambda_1)$$

$$Vr_2 = V(1=\lambda_2)$$

However, no practical means has been presently found for detecting a vehicle speed $V$. This obliges a tentative vehicle speed $V$ to be estimated from the condition of wheel speed $Vw$ varied, and an arithmetic circuit therefor is shown in FIG. 3.

Figure 3:
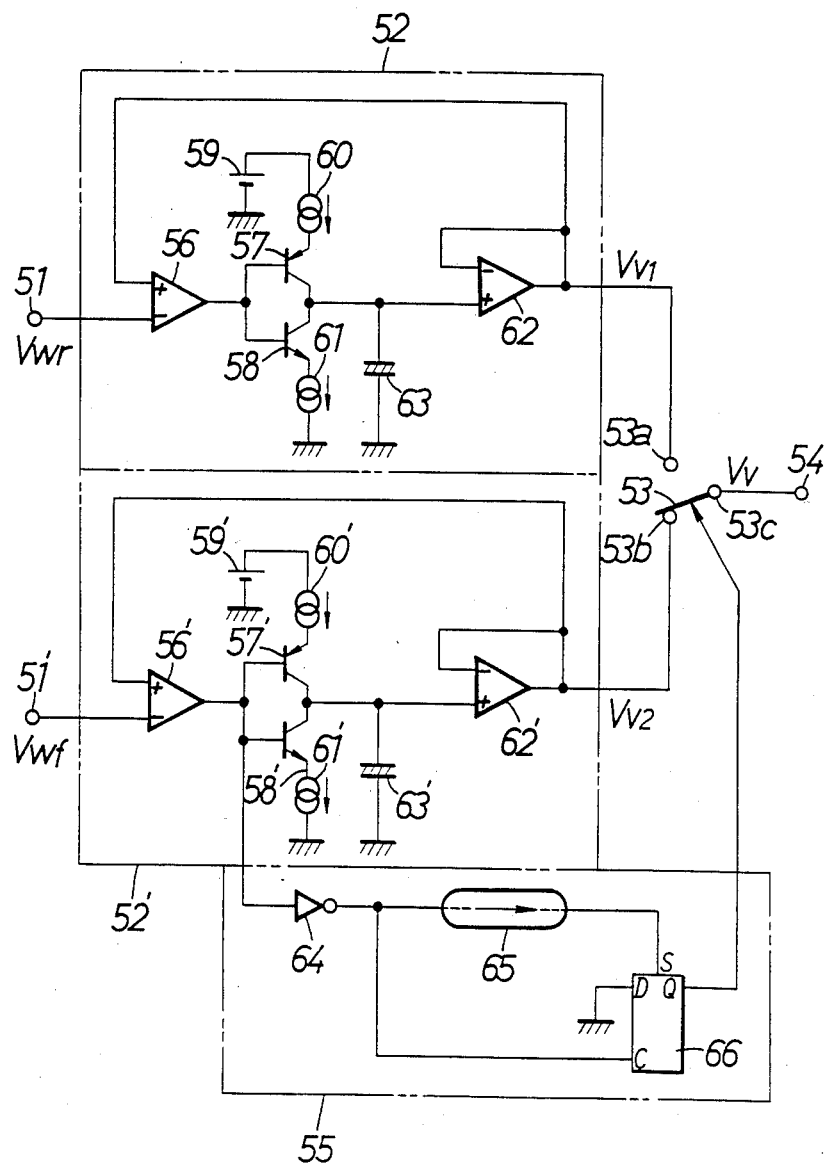

Referring to FIG. 3, a first input terminal 51 is connected to a first arithmetic circuit 52, and a second input terminal 51' is connected to a second arithmetic circuit 52'. Output terminals of the two arithmetic circuits 52 and 52' are connected respectively to separate contacts 53a and 53b of a change-over switch 53 whose common contact 53c is connected to an output terminal 54. Moreover, the change-over switch 53 is driven for switching by a wheel-racing detector circuit 55 connected to the second arithmetic circuit 52'.

A wheel speed $Vwr$ of a driven wheel, for example, a rear wheel is inputted into the first input terminal 51, while a wheel speed Vwf of a driving wheel, for example, the front wheel Vwf is inputted into the second input terminal 51', and the first and second arithmetic circuits 52 and 52' calculate out vehicle speeds $Vv_1$ and $Vv_2$ on the basis of the wheel speed Vwr and Vwf.

In the first arithmetic circuit 52, the input terminal 51 is connected to an inverted input terminal of a comparator circuit 56 whose output terminal is connected to bases of a PNP transistor 57 and an NPN transistor 58 which are connected in series. A DC power source 59 is connected to an emitter terminal of the PNP transistor 57 through a constant-current circuit 60, and an emitter terminal of the NPN transistor 58 is grounded via a constant-current circuit 61. A junction between the two transistors 57 and 58 is connected to a non-inverted input terminal of a buffer circuit 62, and a point between that junction and the buffer circuit 62 is grounded via a capacitor 63. Further, an output terminal of the buffer circuit 62 is connected to the one separate contact 53a of the change-over switch 53 and to a non-inverted input terminal of the comparator circuit 56.

In the first arithmetic circuit 52, when an estimated vehicle speed $Vv_1$ outputted from the buffer circuit 62 is smaller than the wheel speed Vwr, an output from the comparator circuit 56 is at a low level, and the PNP transistor 57 is turned on, while the transistor 58 is turned off, so that a constant current is charged from the constant-current circuit 60 into the capacitor 63. Conversely, when the estimated vehicle speed $Vv_1$ is larger than the wheel speed Vwr, an output from the comparator is at a high level, and the PNP transistor 57 is turned off, while the NPN transistor 58 is turned on, so that the constant-current circuit 61 causes a constant current to be discharged from the capacitor 63. Thus, when the wheel speed Vwr varies slowly, the estimated vehicle speed Vv1 also correspondingly varies slowly. But the wheel speed Vwr varies rapidly, a value in which a given value is added to or subtracted from the estimated vehicle speed $Vv_l$ is inputted as a new estimated vehicle speed $Vv_1$ into the separate contact 53a of the change-over switch 53. More specifically, when the wheel speed Vwr is larger than the estimated vehicle speed $Vv_l$, a value obtained by adding to this estimated vehicle speed a speed changed at the rate of a given value, for example, 1G becomes a new estimated vehicle speed $Vv_1$, and when the wheel speed Vwr is smaller than the estimated vehicle speed $Vv_1$, a value achieved by subtracting from this estimated vehicle speed a speed changed at the rate of a given value, for example, 1G becomes a new estimated vehicle speed $Vv_1$.

The second arithmetic circuit 52' is constructed in the same manner as in the first arithmetic circuit 52 and includes a comparator circuit 56', a PNP transistor 57', an NPN transistor 58', a DC power source 59', constant-current circuits 60' and 61', a buffer circuit 62' and a capacitor 63'. Moreover, a signal outputted from the buffer circuit 62', i.e., an estimated vehicle speed $Vv_2$, is inputted into the separate contact 53b of the change-over switch 53. Also in the second arithmetic circuit 52', when the wheel speed Vwf is larger than an estimated vehicle speed $Vv_2$, a value of this estimated vehicle speed plus a speed changed at the rate of a given value, for example, 1G, is a new estimated vehicle speed $Vv_2$, and when the wheel speed Vwf is smaller than an estimated vehicle speed $Vv_2$, a value of this estimated vehicle speed minus a speed changed at the rate of a given value, for example, 1G, is a new estimated vehicle speed $Vv_2$.

The wheel-racing detector circuit 55 comprises an inverter circuit 64, a timer 65 and a flip-flop 66. An output terminal of the comparator circuit 56' in the second arithmetic circuit 52' is connected to base terminals of the PNP and NPN transistors 57' and 58' and to the inverter circuit 64. A signal inverted by the inverter circuit 64 is inputted into the timer 65 and into a clear input terminal C of the flip-flop 66, and an output from the timer circuit 65 is inputted into a set input terminal S of the flip-flop 66. When a high-level signal has been inputted into the timer 65 continuously for a given period of time, for example, 350 ms or more, the timer 65 outputs a high-level signal with the lapse of such given period.

The flip-flop 66, after a high-level signal has been inputted into the clear input terminal C, outputs a high-level signal from a set output terminal Q according as a high-level signal is inputted into the set input terminal S, and it is reset as a high-level signal is inputted again into the clear input terminal C. The change-over switch 53 operates to have the common contact 53c connected to the one separate contact 53b when an output from the set output terminal Q is at a low level, and to have the contact 53c connected to the other separate contact 53a when an output from the set output terminal Q is at a high level.

When the driving wheel is raced or idling and the wheel speed Vwf is kept larger than the estimated vehicle speed $Vv_2$ for a given period of time, for example, 350 ms or more, the racing detector circuit 55 detects the raced condition, so that the estimated vehicle speed $Vv_1$ based on the wheel speed Vwr of the driven wheel will be outputted as an estimated vehicle speed Vv from the output terminal 54.

Figure 4:
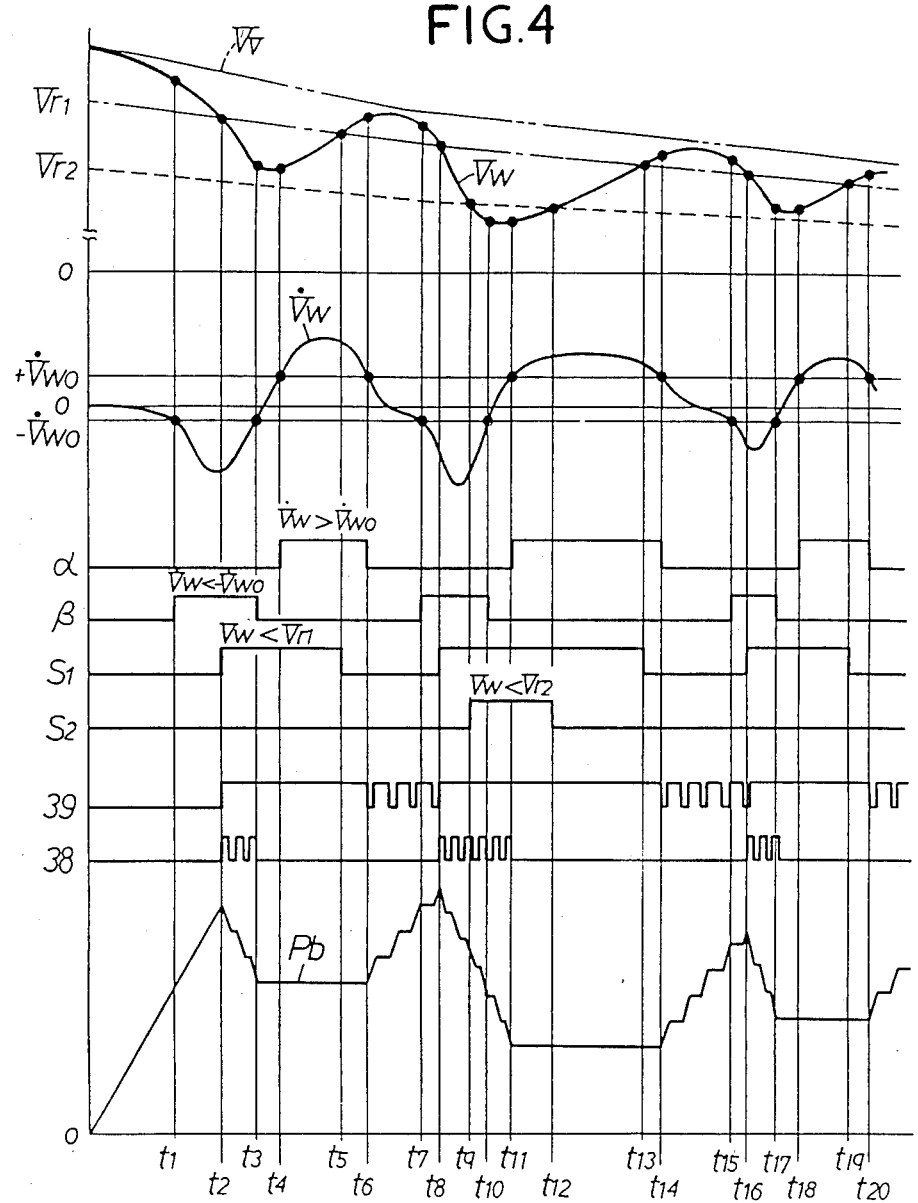

The operation of this embodiment will now be described with reference to FIG. 4. This Figure illustrates one example of an operation mode of the anti-lock braking system, wherein the axis of abscissa represents the lapse of time after starting of braking, and the axis of ordinate represents an actual vehicle speed Vv*, a wheel speed Vw, a first reference wheel speed $Vr_1$ and a second reference wheel speed $Vr_2$ in the uppermost location of the graph; a wheel acceleration $\dot{V}w$, an acceleration reference threshold $+\dot{V}wo$ and a reference wheel deceleration $-\dot{V}wo$ in the second upper location; signals α, β, $S_1$ and $S_2$ and the operational conditions of the solenoids 38 and 39 in the location under the second upper location; and a hydraulic braking pressure Pb in the lowermost location.

Immediately after braking has been started at a time t=0, the outputs of the signals α, β, $S_1$ and $S_2$ are at low levels, and the hydraulic braking pressure Pb gradually increases, accompanied by a gradual decrease in both of wheel speed Vw and wheel acceleration $\dot{V}w$.

When the wheel acceleration $\dot{V}w$ has been lower than the reference wheel deceleration $-\dot{V}wo$ ($\dot{V}w < -\dot{V}wo$) at a time $t_1$, the signal β goes into a high level, but the signal $S_1$ remains at a low level because the wheel speed Vw is larger than the first reference wheel speed $Vr_1$ at this time. Therefore, the hydraulic braking pressure Pb continues to increase, and the wheel speed Vw and the wheel acceleration $\dot{V}w$ also continue to decrease.

When the wheel speed Vw has been lower than the first reference wheel speed $Vr_1$ at a time $t_2$, the signal $S_1$ goes into a high level, and as the output from the AND gate 35 goes into a high level, the output from the OR gate 42 goes into a high level, while the output from the OR gate 41 also goes into a high level. This causes the solenoids 38 and 39 to be excited, thereby opening the inlet valve Vi and closing the outlet valve Vo. As a result, the hydraulic braking pressure Pb starts to decrease, and the wheel acceleration $\dot{V}w$ turns to increase. At this time, the wheel speed Vw continues to decrease.

When the wheel acceleration $\dot{V}w$ has been larger than the reference wheel deceleration $-\dot{V}w$ ($\dot{V}w > -\dot{V}wo$) at a time $t_3$, the signal $\beta$ goes into a low level, and the output from the AND gate 35 correspondingly goes into a low level. This causes the solenoid 38 for the inlet valve Vi to be demagnetized, whereby the inlet valve Vi is closed so that the hydraulic braking pressure Pb may be kept constant. That is, the braking torque is kept substantially constant. Thereafter, the wheel speed Vw starts to increase.

When the wheel acceleration $\dot{V}w$ has been larger than the acceleration reference threshold $+\dot{V}wo$ ($\dot{V}w > +\dot{V}wo$) at a time $T_4$, the signal $\alpha$ goes into a high level. In addition, when the wheel speed Vw has exceeded the first reference wheel speed $Vr_1$ at a time $t_5$, the level of the signal $S_1$ becomes low. Further, when the wheel acceleration $\dot{V}w$ has been lower than the acceleration reference threshold $+\dot{V}wo$ at a time $t_6$, the level of the signal $\alpha$ becomes low, and the outlet valve Vo is opened. This permits the hydraulic pressure Pb to increase.

When the wheel acceleration $\dot{V}w$ has been smaller than the reference wheel deceleration $-\dot{V}wo$ ($\dot{V}w < -\dot{V}wo$) at a time $t_7$, the level of the signal $\beta$ becomes high. When the wheel speed Vw has been lower than the first reference wheel speed $Vr_1$ ($Vw < Vr_1$) at a time $t_8$, the level of the signal $S_1$ becomes high and correspondingly, the output from the AND gate 35 becomes high in level, so that the inlet valve Vi is closed while at the same time the outlet valve Vo is opened. As a result, the hydraulic braking pressure Pb starts to decrease. Then, when the wheel speed Vw has been lower than the second reference wheel speed $Vr_2$ ($Vw < Vr_2$) at a time $t_9$ to increase the possibility for the wheels to be locked, the signal $S_2$ becomes high in level.

When the wheel acceleration $\dot{V}w$ has been larger than the reference wheel deceleration $-\dot{V}w$ at a time $t_{10}$, the signal $\beta$ becomes low in level, but the hydraulic braking pressure Pb further decreases, and the wheel speed Vw turns to increase. When the wheel acceleration $\dot{V}w$ exceeds the acceleration reference threshold $+\dot{V}wo$ at a time $t_{11}$, the signal $\alpha$ becomes high in level, and the output from the AND gate 40 becomes low in level. In this case, because the output from the AND gate 35 is low in level, the output from the OR gate 42 is low in level and hence, the solenoid 38 is demagnetized to cause the inlet valve Vi to be closed. As a result, the hydraulic braking pressure Pb is maintained constant.

When the wheel speed Vw has exceeded the second reference wheel speed $Vr_2$ at a time $t_{12}$, the signal $S_2$ becomes low in level. When the wheel speed Vw exceeds the first reference wheel speed $Vr_1$ at a time $t_{13}$, the signal $S_1$ becomes low in level, but the hydraulic braking pressure Pb is maintained substantially constant, thereby avoiding the locking of the wheels from occurring. When the wheel acceleration $\dot{V}w$ has decreased lower than the acceleration reference threshold $+\dot{V}wo$ at a time $t_{14}$, the signal $\alpha$ becomes low in level, so that the outlet valve Vo is opened. Consequently, the hydraulic braking pressure Pb starts to increase.

When the wheel acceleration $\dot{V}w$ has decreased lower than the reference wheel deceleration $-\dot{V}wo$ at a time $t_{15}$, the signal $\beta$ becomes high in level. When the wheel speed Vw has decreased lower than the first reference wheel speed $Vr_1$ at a subsequent time $t_{16}$, the inlet valve Vi is opened, and at the same time, the outlet valve Vo is closed, according as the signal $S_1$ becomes high in level. Thus, the hydraulic braking pressure Pb starts to decrease. Further, when the wheel acceleration $\dot{V}w$ has exceeded the reference wheel deceleration $-\dot{V}wo$ at a time $t_{17}$, and according as the signal $\beta$ becomes low in level, the outlet valve Vo is opened, so that the hydraulic braking pressure Pb is kept constant.

When the wheel acceleration $\dot{V}w$ has exceeded the acceleration reference threshold $+\dot{V}wo$ at a time $t_{18}$, the signal $\alpha$ becomes high in level, and when the wheel speed Vw has exceeded the first reference wheel speed $Vr_1$ at a time $t_{19}$, the signal $S_1$ becomes low in level. Further, when the wheel acceleration $\dot{V}w$ has decreased lower than the acceleration reference threshold $+\dot{V}wo$ at a time $t_{20}$, the signal $\alpha$ becomes low in level, so that the outlet valve Vo is opened and the hydraulic braking pressure Pb starts to decrease.

Thereafter, the above procedure is likewise repeated, so that the vehicle speed gradually decreases without encountering locking of the wheels.

Figure 5:
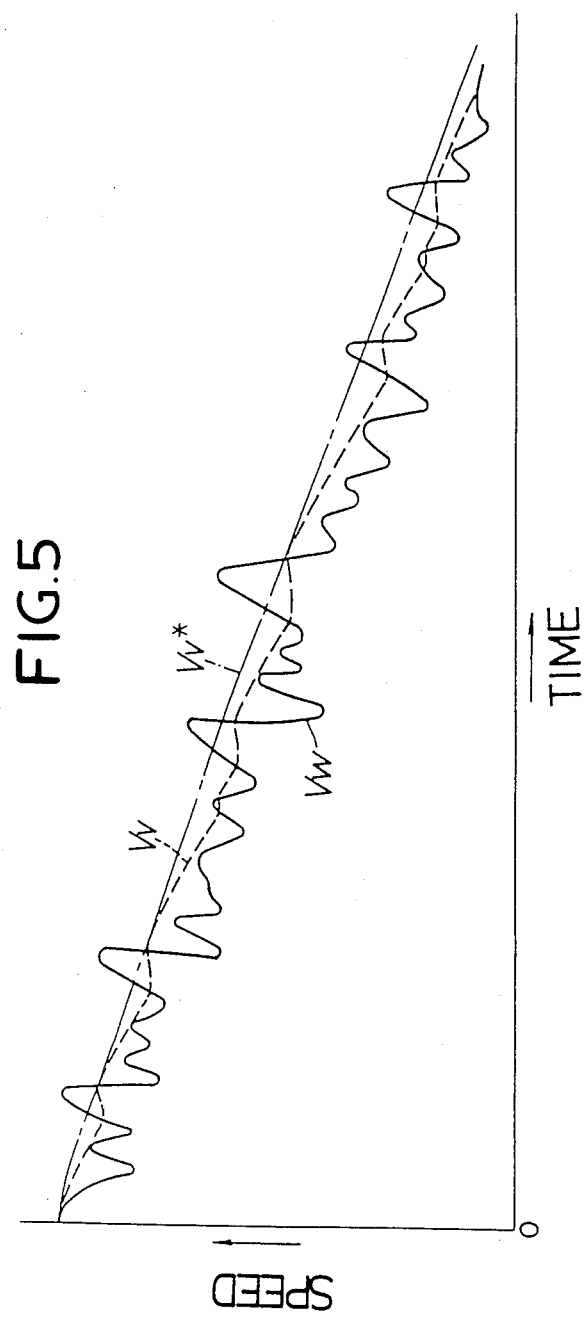

With reference to FIG. 5, a description will be made supposing that the wheel speed Vw is pulsating during vehicle travel on a rough or bad road. In this case, with the drive wheel, e.g., the front wheel, being not raced, a vehicle speed $Vv_2$ calculated in the second arithmetic circuit 52' on the basis of a wheel speed Vwf of the drive wheel is employed as an estimated vehicle speed Vv.

In such condition, when the wheel speed Vw has become larger than the estimated vehicle speed Vv, the PNP transistor 57' is turned on, while the transistor 58' is turned off in the second arithmetic circuit 52'. Therefore, the capacitor 63' is charged with a constant current and thus, a value obtained by adding to such estimated vehicle speed a speed at the rate 1G which then becomes a new estimated vehicle speed. This suppresses the increase rate of the estimated vehicle speed Vv to be lower as compared to the wheel speed Vw and also the first and second reference wheel speeds $Vr_1$ and $Vr_2$ to be lower. As a result, the wheel speed Vw is prevented from falling below the first reference wheel speed $Vr_1$, and the hydraulic braking pressure is prevented from decreasing.

If the drive wheel is raced, such racing is detected by the racing detector circuit 55 when the condition of a wheel speed Vwf of that drive wheel exceeding the estimated vehicle speed $Vv_2$ has continued for a given period of time, for example, 350 ms or more. Then the change-over switch 53 operates so that the common contact 53c is connected to the separate contact 53a. Accordingly, a vehicle speed $Vv_1$ calculated in the first arithmetic circuit 52 is employed as an estimated vehicle speed Vv. As a result, the estimated vehicle speed Vv is prevented from becoming higher than the actual vehicle speed Vv*, and the anti-lock operation is prevented from occuring when such operation is unnecessary.

What is claimed is:

1. A method of estimating a vehicle speed of a vehicle, comprising estimating a vehicle speed on the basis of a wheel speed and comparing a reference threshold derived from said estimated vehicle speed with said wheel speed to control the supplying of a hydraulic braking pressure to a wheel brake, wherein when the wheel speed is larger than the estimated vehicle speed, a first predetermined value is added to that estimated vehicle speed to give a new estimated vehicle speed, and when the wheel speed is smaller than the estimated vehicle speed, a second predetermined value is subtracted from that estimated vehicle speed to give a new estimated vehicle speed, and wherein said first and second predetermined values are independent of the wheel speed.

2. A method of estimating a vehicle speed according to claim 1, wherein said vehicle speed is independently estimated from speeds of driving and driven wheels of said vehicle, and one of thus estimated vehicle speeds is selectively used, depending upon rotational conditions of said driving and driven wheels, to control the supplying of the hydraulic braking pressure to the wheel brakes for said driving and driven wheels.

3. A method of estimating a vehicle speed of a vehicle, comprising estimating a vehicle speed on the basis of a wheel speed and comparing a reference threshold devised from said estimated vehicle speed with said wheel speed to control the supplying of a hydraulic braking pressure to a wheel brake, wherein when the wheel speed is larger than the estimated vehicle speed, a first predetermined value is added to that estimated vehicle speed to give a new estimated vehicle speed, and when the wheel speed is smaller than the estimated vehicle speed, a second predetermined value is subtracted from that estimated vehicle speed to give a new estimated vehicle speed, and whenever said wheel speed is greater than said estimated vehicle speed for a time period longer than a predetermined period of time, said wheel is judged to be in a raced condition, and wherein said first and second predetermined values are independent of the wheel speed.

4. A method of estimating a vehicle speed according to claim 3, wherein a wheel speed of a driving wheel of said vehicle is normally used as said wheel speed, and when said driving wheel is detected to be in a raced condition, a wheel speed of said driven wheel of the vehicle is substituted for said wheel speed of said driving wheel.

5. A method of estimating a vehicle speed according to claim 3, wherein said vehicle speed is independently estimated from the speeds of a driving wheel and a driven wheel of said vehicle, and one of those estimated vehicle speeds is selectively used, depending upon the rotational condition of said driving and driven wheels, to control the supplying of the hydraulic braking pressure to the wheel brakes for said driving and driven wheels, and whenever one of said driving and driven wheels is not in a raced condition, an estimated vehicle speed given from said one wheel is used, and when said one wheel is in a raced condition, an estimated vehicle speed given from the other wheel is used.

6. A method of estimating a vehicle speed of a vehicle, comprising estimating a vehicle speed on the basis of a wheel speed and comparing a reference threshold derived from said estimated vehicle speed with said wheel speed to control the supplying of a hydraulic braking pressure to a wheel brake, wherein when the wheel speed is larger than the estimated vehicle speed, a first predetermined value is added to that estimated vehicle speed to give a new estimated vehicle speed, and when the wheel speed is smaller than the estimated vehicle speed, a second predetermined value is subtracted from that estimated vehicle speed to give a new estimated vehicle speed, wherein said first and second predetermined values are independent of the wheel speed; and wherein a wheel speed of said driving wheel is normally used as said wheel speed, and when said driving wheel is detected to be in a raced condition, a wheel speed of said driven wheel of the vehicle is substituted for said wheel speed of said driving wheel.

7. A method of estimating a vehicle speed of a vehicle, comprising estimating a vehicle speed on the basis of a wheel speed and comparing a reference threshold derived from said estimated vehicle speed with said wheel speed to control the supplying of hydraulic braking pressure to a wheel brake; wherein, when the wheel speed is larger than the estimated vehicle speed, a first predetermined value is added to that estimated vehicle speed to give a new estimated vehicle speed, and when the wheel speed is smaller than the estimated vehicle speed, a second predetermined value is subtracted from that estimated vehicle speed to give a new estimated vehicle speed; wherein, said vehicle speed is independently estimated from speeds of driving and driven wheels of said vehicle, and one of thus estimated vehicle speeds is selectively used, depending upon rotational conditions of said driving and driven wheels, to control the supplying of the hydraulic braking pressure to the wheel brakes for said driving and driven wheels; wherein said first and second predetermined values are independent of the wheel speed and wherein, one of said driving and driven wheels is not in a raced condition, and estimated vehicle speed given from said one wheel is used, and when said one wheel is in a raced condition, an estimated vehicle speed given from the other wheel is used.

8. A method of estimating a vehicle speed according to claim 7, wherein said one wheel is the driving wheel.

9. An apparatus of estimating vehicle speed, comprising an arithmetic circuit including a wheel speed input terminal to which is inputted a wheel speed of a wheel of a vehicle, the arithmetic circuit further including a comparator circuit having input terminals and an output terminal, first and second transistors connected in series with each other and having bases connected to the output terminal of said comparator circuit, a buffer circuit having input terminals and an output terminal, and a capacitor which is grounded, a junction between said first and second transistors being connected to one of the input terminals of said buffer circuit, said capacitor being connected to a point between said junction and said buffer circuit, wherein said wheel speed input terminal is connected to one of the input terminals of the comparator circuit and said output terminal of the buffer circuit outputs an estimated vehicle speed and is connected to another of the input terminals of the comparator circuit, and wherein said first transistor and said second transistor are associated with respective constant-current circuits in such a manner that when the output terminal of said comparator circuit generates an output of a low level due to the estimated vehicle speed being smaller than the wheel speed, a constant current is charged into said capacitor from one of the constant-current circuits connected to a power source via its associated transistor whereas when the output terminal of said comparator circuit generates an output of a high level due to the estimated vehicle speed being larger than the wheel speed, a constant current is discharged from said capacitor by means of the other of the constant-current circuits and its associated transistor.

10. An apparatus according to claim 9, wherein said vehicle has a driving wheel and a driven wheel and said arithmetic circuit is provided for each of said driving wheel and said driven wheel, and wherein estimated vehicle speeds derived from such respective arithmetic circuits are alternatively picked up for use via a switch means.

11. An apparatus according to claim 10, further comprising a wheel-racing detector circuit associated with the arithmetic circuit for the driving wheel and the arithmetic circuit for the driven wheel and adapted to detect a raced condition of the associated wheel, said wheel-racing detector circuit causing, upon detection of the raced condition of the wheel, said switch means to be switched to change the estimated vehicle speed to be picked up.

12. An apparatus according to claim 11, wherein said wheel-racing detector circuit is associated with said arithmetic circuit for the driving wheel and operates said switch means such that when the raced condition of the driving wheel is not detected, said switch means selects the estimated vehicle speed derived from the arithmetic circuit for the driving wheel whereas when the raced condition of the driving wheel is detected, said switch means selects the estimated vehicle speed derived from the arithmetic circuit for the driven wheel.

* * * * *